United States Patent [19]

West et al.

[11] Patent Number: 4,808,356

[45] Date of Patent: Feb. 28, 1989

[54] METHOD FOR INSULATING A WATER HEATER

[75] Inventors: Eugene L. West, Grand Rapids; Robert J. Marcinkewicz, Plainwell, both of Mich.

[73] Assignee: Bradford-White Corporation, Philadelphia, Pa.

[21] Appl. No.: 876,095

[22] Filed: Jun. 19, 1986

[51] Int. Cl.⁴ .............................................. B29C 67/22
[52] U.S. Cl. .................................. 264/46.5; 264/466; 264/46.9; 264/255; 264/278
[58] Field of Search ..................... 264/46.5, 46.6, 46.7, 264/46.9, 261, 262, 278, 254, 255; 156/79, 294; 29/455 R, 460

[56] References Cited

U.S. PATENT DOCUMENTS

| | | | |
|---|---|---|---|
| 3,253,731 | 5/1966 | Fink et al. | 264/46.9 |
| 3,697,633 | 10/1972 | Edgar | 264/46.5 |
| 3,793,411 | 2/1974 | Stonitsch et al. | 264/46.5 |
| 4,372,028 | 2/1983 | Clark et al. | 264/46.9 |
| 4,447,377 | 5/1984 | Denton | 264/46.5 |
| 4,477,399 | 10/1984 | Tilton | 264/46.5 |
| 4,628,184 | 12/1986 | West | 264/46.5 |
| 4,632,792 | 12/1986 | Clark | 264/46.6 |

Primary Examiner—Jan H. Silbaugh
Assistant Examiner—Allan R. Kuhns
Attorney, Agent, or Firm—Austin R. Miller

[57] ABSTRACT

Apparatus and method of insulating a water heater that utilizes a foaming apron comprised of substantially parallel flexible sheets having an open end and open edges. One sheet is attached to the wall of a water tank and the space between the sheets is open to receive one or more charges of foam forming liquid. Preferably one pouring is performed in conjunction with an open centering template, thereby creating a uniform sealing insulatio layer around the water tank which protects the control mechanisms from the foam. After one charge has solidified sufficiently to maintain the jacket properly centered, the centering template may be removed and one or more further charges of foam forming liquids introduced.

4 Claims, 2 Drawing Sheets

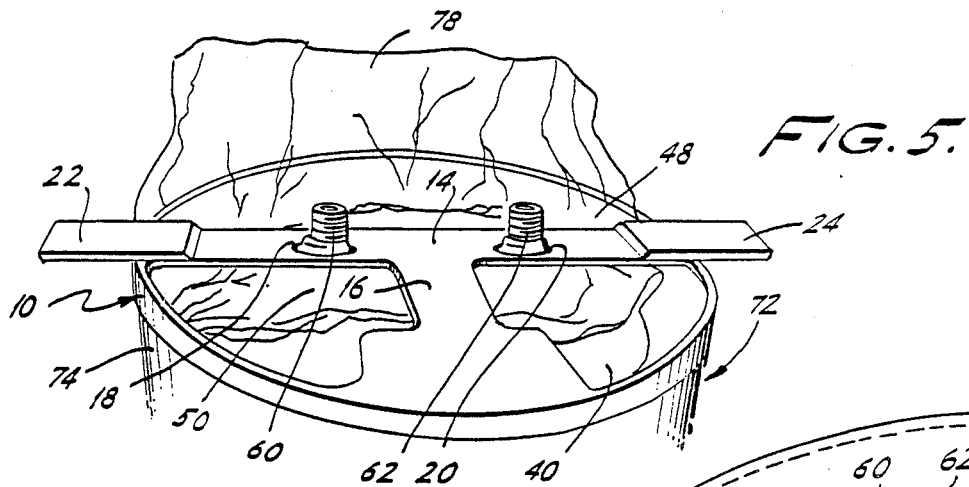
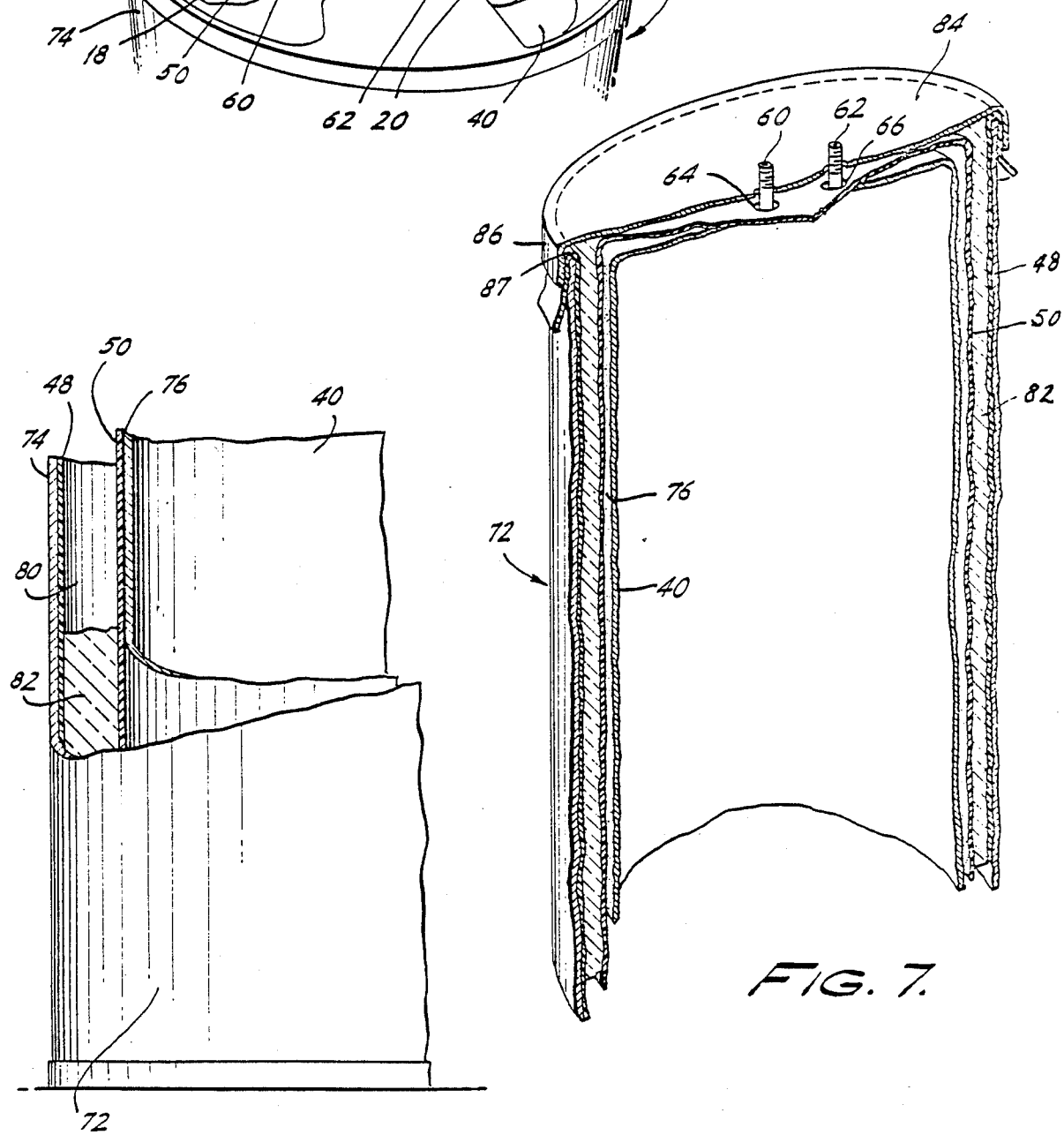

METHOD FOR INSULATING A WATER HEATER

FIELD OF THE INVENTION

This invention relates to an apparatus and method for interposing an expandable insulating foam layer between an inner water tank and an outer jacket for a water heater.

Domestic and commercial water heaters which are mass produced for common hot water requirements generally have an inner water tank which occupies a significant portion of the total volume of the heater. The tank is generally surrounded by some form of insulation to increase the thermal efficiency of the unit. Because fuel consumption has become more important over time, the insulation aspect of the water heater has become critical. A jacket surrounds the water tank, the insulation and the control mechanisms which are included on the heater, and acts for aesthetic purposes as well as for safety.

There have been numerous problems that have confronted water heater manufacturers in trying to find a suitable insulation layer to surround the water tank.

The industry has recently found a substitute for fiberglass insulation. It has been found that a variety of urethane foams provide a better means of insulating water heaters mainly because they possess improved insulating characteristics over fiberglass. However, it has been found that there are many problems that are associated with the use of foam. One important problem in placing foam insulation around a water tank is that non-uniform expansion of the foam tends to move the jacket and it has accordingly not been possible to keep the tank centered with respect to the jacket. When fiberglass was the primary insulation, centering was not as critical. Because the walls of the water tank and the walls of the jacket surround the foam, it is most critical that the tank is properly centered, especially when a relatively thin foam layer is specified. If the tank is not centered, there is an undesirable decrease in the thickness of the space available to receive foam on one side of the tank, thereby creating a severe insulation deficiency. On the other side, there will be an increased thickness beyond that which is necessary to provide effective insulation. Thus, the total fuel efficiency of the water heater will not be maximized. Eccentricity also causes the problem that the top cover for the water heater will not fit because water line nipples and electrical wiring extending upward from the top of the tank are out of alignment with precut holes in the top cover.

Another problem, especially in an electric heater, created by the use of foam is protection for the control devices which are mounted on the side of the tank and reside in the space between the tank and the jacket. This problem has been addressed in U.S. Pat. No. 4,632,792, granted Dec. 30, 1986. Without protection, the foam expands into the interior of the control devices and contaminates the operating mechanisms resulting in their becoming inoperative.

DESCRIPTION OF THE PRIOR ART

U.S. Pat. No. 4,447,377 discloses a method of insulating the exterior of a water heater tank. A plastic envelope is wrapped around the exterior of a water tank. A jacket is slipped over the tank and the envelope. A cover is placed over the top and foam is poured through the cover. However, this method requires the use of a large amount of plastic material to surround the tank and to line both sides of the insulation space. The envelope is subject to improper placement. It must fit exactly along the water tank and jacket sides without any improper folding or crinkling. If this occurs, the envelope walls will prevent foam from travelling to all the available voids which must be filled in order to maximize thermal efficiency. Also, the envelope must be manufactured for use in a particular size of water heater. This contributes to a lack of manufacturing flexibility due to the inability to interchange envelopes with other sizes of water heaters. Moreover, the foaming process is performed with the top cover in place. This is undesirable for various reasons, including the need to make a hole in the top cover in order to introduce the foam and then to plug the hole after injection of the foam.

U.S. Pat. No. 4,372,028 discloses a method of manufacturing a foam insulated tank. In one embodiment, a plastic bag is filled with urethane foam and wrapped around the lowermost portion of a water tank. Before the foam can expand, a jacket is placed over the tank and the bag. Then a cover is put over the tank and the jacket, and foam is poured into the space between the side walls of the tank and the jacket.

In another embodiment, a bag is attached to the top of the tank extending downward along the side wall. The jacket is put in place and the bag is filled. After the foam in the bag has expanded, more foam is poured into the space between the tank and the jacket.

In the first embodiment the separate foaming and transporting of the bag is labor intensive. Further, there are no means provided to insure that the bag expands evenly. The result can be an improperly centered tank. Because the bag is filled before the jacket is in place in the first embodiment, timing becomes critical. In the other embodiment, the longitudinally placed bag tends to shift the jacket off center. In both cases production flexibility suffers since a specific bag manufactured to exact dimensions must be provided. If the jacket is not properly placed before expansion takes place, the expanded bag as it solidifies tends to prevent the proper placement of the jacket or preclude its placement altogether.

OBJECTS OF THE INVENTION

Thus, it is an object of the present invention to provide a method of insulating a water heater that utilizes pourable liquids to produce expandable foam of superior insulating quality that will uniformly surround and seal a water tank from the surrounding environment.

It is another object of the present invention to provide a method of insulating a water heater that utilizes the minimum amount of insulating foam to achieve maximum enery efficiency to reduce operating costs, yet is simple to manufacture.

It is a further object of the present invention to provide a method of insulating a water heater that insures that the water tank is centered with respect to the outer jacket and protects the water heater control mechanisms from contamination by the foam, all with minimal production effort.

SUMMARY OF THE INVENTION

The present invention provides a method of insulating a water heater that utilizes a foaming apron comprised of substantially parallel flexible sheets having an open end and open edges. One sheet is attached to the wall of a water tank and the space between the sheets is open to receive one or more charges of foam forming liquid. Preferably one pouring is performed in conjunction with a centering template, thereby creating a uniform sealing insulation layer around the water tank which protects the control mechanisms from the foam. After one charge has solidified sufficiently to maintain the jacket properly centered, the centering template may be removed and one or more further charges of foam forming liquids introduced.

BRIEF DESCRIPTION OF THE DRAWINGS

FIG. 5 is a top perspective view of a water heater having a foaming apron with a template in place over the jacket and centering the tank with respect thereto.

FIG. 6 is a side view of a lower portion of a water heater according to the invention, in cross-section and partly broken away.

FIG. 7 depicts a water heater in accordance with the invention in perspective, taken in cross-section.

DETAILED DESCRIPTION OF THE DRAWINGS

Figure 1:
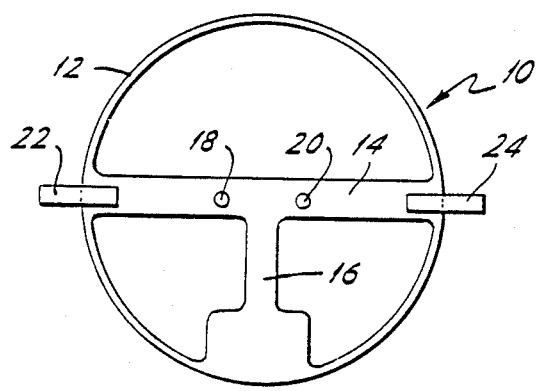
FIG. 1 is a top plan view of one embodiment of a template utilized in accordance with the invention.

Template 10 for centering a water tank with respect to a surrounding jacket is shown in FIG. 1. Template 10 has a circular outer rim 12 and inner reinforcing ribs 14 and 16. Attached to rim 12 and ribs 14 and 16 are handles 22 and 24. Rib 14 has nipple holes 18 and 20 extending therethrough.

Figure 2:
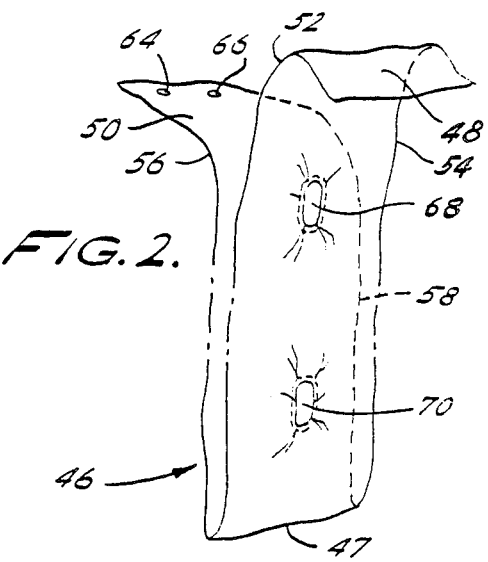
FIG. 2 shows in perspective one form of foaming apron which is used in accordance with the invention.

FIG. 2 shows foaming apron 46 comprising outer sheets 48 and inner sheet 50. Outer sheet 48 has open edges 52 and 54. Inner sheet 50 has open edges 56 and 58. Apron 46 is closed at its bottom 47 and open at the top. Inner sheet 50 has holes 64 and 66 near the top to allow apron 46 to be attached to water tank 40. Apron 46 also has holes 68 and 70 to allow control mechanisms (not shown) to extend outward to the jacket.

Figure 3:
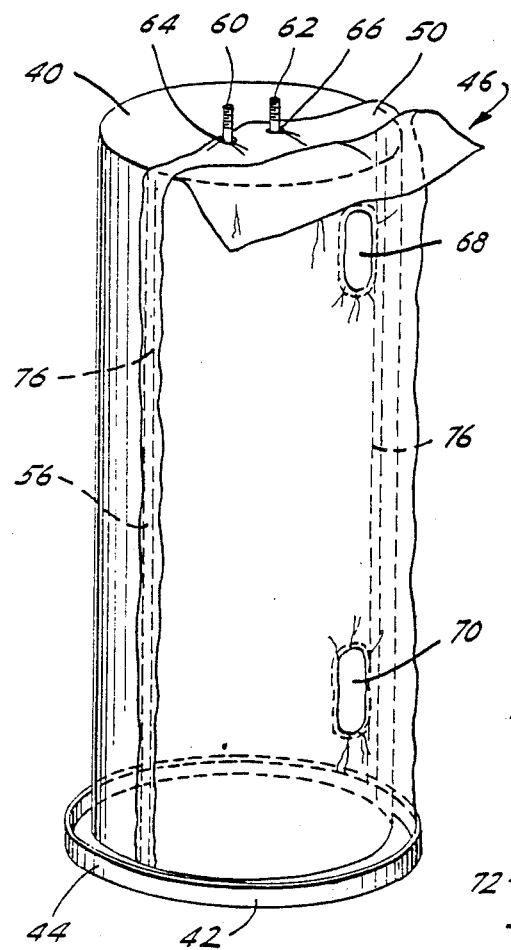
FIG. 3 is a perspective view of a water heater having a foaming apron in accordance with the invention, with the jacket removed for ease of understanding.

Water tank 40 is shown in FIG. 3 centrally positioned on bottom pan 42 which has a vertically extending rim 44. Foaming apron 46 extends longitudinally along only a part of the side of water tank 40. Inner sheet 50 is attached to tank 40 through hole 64 by nipple 60, and hole 66 by nipple 62 (see FIG. 3) and further attached to the side of tank 40 by adhesive strip 76 along open edge 56.

Figure 4:
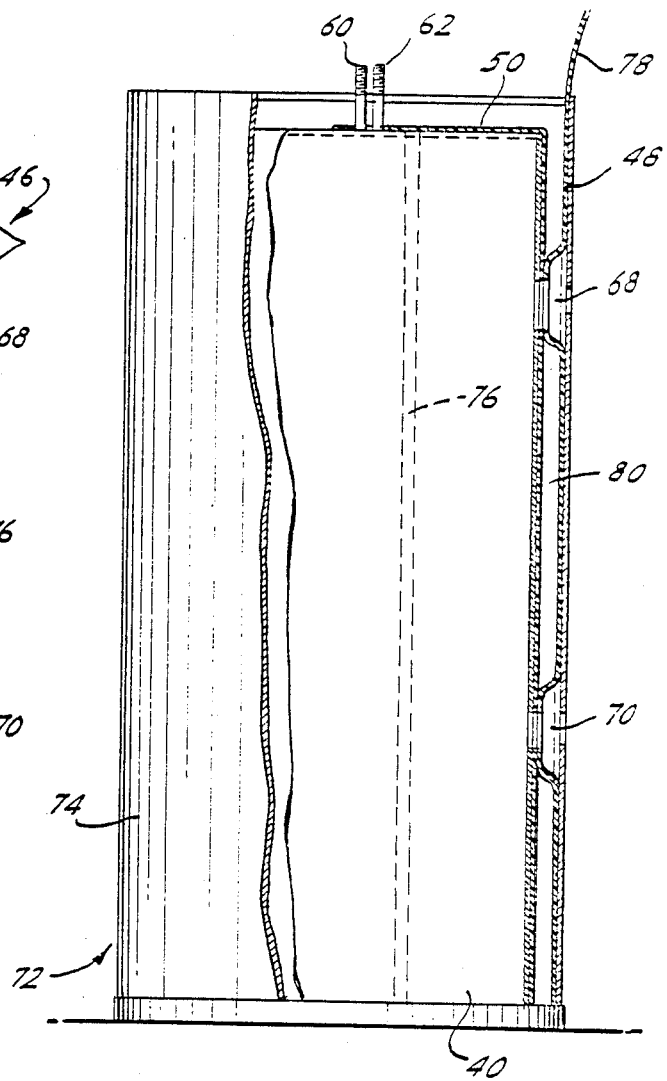
FIG. 4 shows a side view of a water heater having a foaming apron, partly broken away and partly in section.

FIG. 4 shows water heater 72 having jacket 74 surrounding water tank 40 as both sit on pan 42. Apron 46 (from FIGS. 2 and 3) is interposed between portions of jacket 74 and tank 40. Inner sheet 50 remains attached to tank 40 as in FIG. 3. The top portion of outer sheet 48 remains unattached to tank 40 or jacket 74 at point 78. Space 80 is formed between jacket 74 and tank 40.

FIG. 5 shows a top view of water heater 72 with template 10 in position. Inner sheet 50 is attached to tank 40 through holes 64 and 66 by nipples 60 and 62. Outer sheet 48 remains unattached to jacket 74 and extends upward and through template 10 at top portion 78. Template 10 centers tank 40 with respect to jacket 74 through the close alignment of nipples 60 and 62 through template holes 18 and 20. Handles 22 and 24 can be used to lower template 10 into place.

A portion of water heater 72 contains foam 82 as shown in FIG. 6. Outer sheet 48 extends along the side wall of jacket 74. Inner sheet 50 extends along the side wall of water tank 40 with adhesive strip 76 interposed therebetween. Some of space 80 remains unfilled.

FIG. 7 shows water heater 72 filled with foam 82. Space 80 has been entirely filled with foam 82. Top cover 84 is in place over water heater 72, with rim 86 extending over fold 87 of outer sheet 48 which is folded when top cover 84 is applied. Foam 82 extends along the sides of water heater 72 between outer sheet 48 and inner sheet 50.

The method of manufacturing a water heater in accordance with this invention will now be explained in detail.

Referring to FIG. 3, the tank 40 is accurately centered in pan 42 and foaming apron 46 is placed against the side of water tank 40 as it sits in pan 42. Foaming apron 46 is preferably made from a flexible polymeric material which is not susceptible to permeation by the typical urethane foams in use for insulation purposes, or the liquids which are mixed in place to create the foam. The apron 46 can be formed from a single piece of material folded essentially in half or by connecting together two separate pieces. Holes 68 and 70 are cut in both sections of apron 46, with the edges being sealed together to prevent the flow of foam therethrough.

Holes are placed in inner sheet 50 of apron 46 to receive nipples 60 and 62. Initially, inner sheet 50 is draped over the side of water tank 40 and hung over the nipples as shown in FIG. 3. Inner section 50 is further connected to the side walls of water tank 40 by fixing means. Preferably, two vertical strips of adhesive are sprayed onto the tank which are separated from each other part way around the circumference of the tank. This corresponds approximately to the coverage of the apron as it extends partially around the side of the tank. Thus, the apron does not extend around the entire circumference of the tank. The apron should be placed such that any control mechanisms mounted on the water tank are appropriately aligned to extend through holes 68 and 70.

The adhesive strips should preferably extend along the entire length of the tank and should be unbroken. The edges of inner sheet 50 can then be attached to the adhesive thereby preventing foam from expanding under the inner sheet 50, in contact with the tank wall and possibly into contact with the control mechanisms. With apron 46 in position, jacket 74 is lowered over tank 40 and into pan 42, with top portion 78 of outer sheet 48 remaining free and extending through the open space in template 10.

The control mechanisms of the water heater are completely protected from the expandable foam fluids by the adhesive strips and the sealed holes 68 and 70. There is no risk of foam filled bags bursting since the apron 46 is open at the top and along both longitudinal end edges. Apron 46 is easily positioned over water tank 40 before jacket 74 is positioned, thereby reducing installation time and effort.

In a further step of the manufacturing method, after placing jacket 74 over tank 40, tank 40 is accurately centered with respect to jacket 74 before the introduction of any foam. Template 10 (see FIG. 5) is lowered over jacket 74, preferably with convenience handles 22 and 24 and serves as a spacer means to maintain a given space or distance between tank 40 jacket 74. Rim 12 surrounds the uppermost edge of jacket 74 and top portion 78 of outer sheet 48 extends upward and through template 10 and between rim 12 and rib 14. Holes 18 and 20 are cut from rib 14 in template 10 at predetermined positions whereby nipples 60 and 62 from FIG. 2 accurately extend therethrough. When tank 40 is in a position such that nipples 60 and 62 match with holes 18 and 20, tank 40 is then accurately centered with respect to jacket 74. Centering creates substantially symmetrical space 80 (FIG. 4) which insures uniform thickness of the insulation layer which maximizes the efficiency of the unit. Also, the pre-cut holes typically cut into the top pan that allows nipples 60 and 62 to connect with hot and cold water lines, are properly aligned after foam has been added.

With template 10 in place, a first charge of foam forming chemicals is poured into space 80. The foam forming liquids should be introduced at a position between inner and outer sections 50 and 48 of apron 46. As the liquids travel downward between the sections 50 and 48, they are not constrained and are free to run out from apron 46 through its open longitudinal end edges and into the lowermost portion of space 80 as shown in FIG. 6. There is no specific limitation as to the quantity of foam required in the first application, although an amount sufficient to fill a lower portion of space 80 is preferred. Enough foam should be introduced to completely surround tank 40 near its base.

After the first quantity of foam is introduced, the foam is allowed to become at least partially solidified, after which time the template 10 can be removed. Tank 40 remains centered because of the stabilizing influence of the foam that completely surrounds the lowermost portion of the tank.

The template 10 is preferably removed after partial solidification of the first quantity of foam, although removal is not necessary. A pre-measured balance of the foam forming liquids is then introduced into space 80 without having yet placed the top cover over the water heater unit. Before the foaming operation is complete, top cover 84 is lowered over jacket 74 and secured in position, as with screws. Any remaining exposed portions of outer section 48 extending beyond fold 87 are trimmed away to improve aesthetics. The foam forming liquids react and the foam expands throughout the space enclosed by the jacket, and with the cover 84 already in place.

Thus, for the first time the present invention utilizes a specially designed and constructed foaming apron which permits the easy introduction of foam forming liquids between the water tank and jacket. The apron protects the control mechanisms of the water heater from the resulting foam and poses no problems with regard to shifting the tank during foam solidification as do other methods. In fact, the introduction of a first limited quantity which freely flows from the apron and around the bottom of the tank prevents possible water tank eccentricity. The apron is highly flexible in that it is simple to install and can be used on varying sizes of water heaters, whereas other envelopes and bags are more difficult to install, have a potential to burst and are quite limited in their use in multiple sizes of water heaters.

The template designed and utilized according to the present invention further insures that the tank is initially centered with respect to the jacket, and remains centered. Furthermore, it properly aligns the upwardly extending water line nipples with the precut holes in the top pan which has not heretofore been possible. The template provides further flexibility in that foam forming liquids are introduced in an open environment visible to the operator prior to placement of the top cover, which has never been accomplished. The result is a water heater being completely and evenly insulated which maximizes thermal and fuel efficiency.

Although this invention has been described in connection with specific forms thereof, it will be appreciated that a wide array of equivalents may be substituted for the specific elements shown and described herein without departing from the scope of this invention as described in the appended claims.

We claim:

1. A method of insulatting with foam a water heater having an inner water tank and an outer jacket which method comprises;
    positioning said jacket around said tank;
    applying a removable spacer to the top of the tank and the top of the jacket thereby substantially centering said tank with respect to said jacket, thereby forming a substantially uniform space therebetween;
    introducing a charge of foam forming liquid between said tank and said jacket while maintaining said tank substantially centered by said spacer and directing said foam forming liquid into a lower portion of said space, whereby foam formed from the liquid fills a substantially centered lower portion of said space;
    causing said foam in said lower portion of said space to set up with sufficient firmness to cause said foam to maintain said lower portion of said jacked centered with respect to said tank;
    removing said spacer from the top of the tank and the top of the jacket and introducing a further charge of foam forming liquid between said tank and said jacket in an amount further to fill said space; and
    securing a top cover to said jacket to cover the space between the tank and the jacket, whereby the further charge of foam forming liquid forms a foam and expands with the top cover in place.

2. The method defined in claim 1 wherein said tank is centered with respect to said jacket by placing an open template aligned with said tank and contacting said jacket, at locations around their peripheries thereby substantially concentrically aligning said jacket around said tank.

3. A method of insulating with foam a water heater having an inner water tank and an outer jacket and having control mechanisms mounted on said tank which are intended not to be contacted by said foam, which method comprises;
    providing a foaming apron having inner and outer flexible sheets, said sheets being connected to one another at the bottom and being open at the top and along its longitudinally extending end edges,
    attaching said apron to an upper portion of said tank and positioning said apron along the wall of said tank and around said control mechanisms mounted on said tank, said apron having sealed cut-out portions protecting said control mechanisms from fluid foam to be introduced between said sheets;
    positioning said jacket around said tank and said apron;
    separating the inner and outer sheets to facilitate the introduction of foam between said sheets;

causing a removable spacer to contact the top of the tank and the top of the jacket at locations around their peripheries;

introducing a foam forming liquid between the inner and outer flexible sheets in a limited quantity into the space between said tank and said jacket, and directing said foam forming liquid into a lower portion of said space, said limited liquid quantity forming foam being sufficient only to fill a lower portion of said space between said tank and said jacket;

causing said limited quantity of foam partially to solidify in said lower portion of said space;

removing a spacer from the top of the tank and the top of the jacket;

while maintaining the top of the tank and top of the jacket open and free of connection to each other, and with their centered relationship maintained by the thickened foam in the lower portion of said space, introducing an additional quantity of foam forming liquid into said open space, and securing a top cover to said jacket to cover the space between the tank and the jacket, whereby the further charge of foam forming liquid forms a foam and expands with the top cover in place.

4. The method defined in claim 3 wherein said tank is centered with respect to said jacket by placing an open template having a plurality of holes therein to receive water line nipples from said tank and an outer rim to receive the top of said jacket over said jacket thereby substantially concentrically aligning said jacket around said tank.

* * * * *

UNITED STATES PATENT AND TRADEMARK OFFICE
CERTIFICATE OF CORRECTION

PATENT NO. : 4,808,356

DATED : Feb. 28, 1989

INVENTOR(S) : Eugene L. West and Robert L. Marcinkewicz

It is certified that error appears in the above-identified patent and that said Letters Patent is hereby corrected as shown below:

Column 7, line 14 delete "a" and insert --the--

Signed and Sealed this

Fifth Day of December, 1989

*Attest:*

JEFFREY M. SAMUELS

*Attesting Officer*  *Acting Commissioner of Patents and Trademarks*